Nov. 8, 1927.

J. ANDERSON

POWER PLANT

Filed June 10, 1927

John Anderson,
INVENTOR

BY Victor J. Evans
ATTORNEY

Nov. 8, 1927.
1,648,837
J. ANDERSON
POWER PLANT
Filed June 10, 1927
2 Sheets-Sheet 2
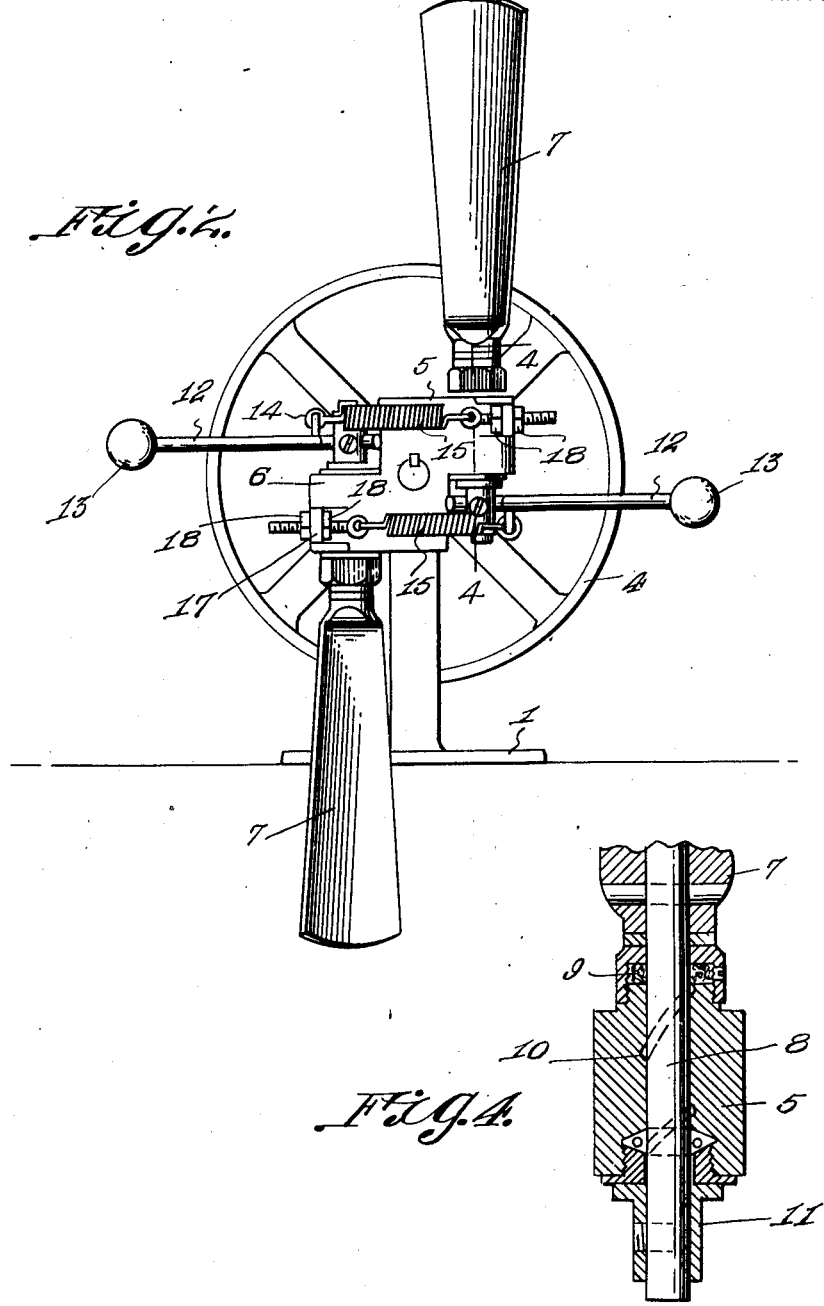

Patented Nov. 8, 1927.

1,648,837

UNITED STATES PATENT OFFICE.

JOHN ANDERSON, OF KARLSTAD, MINNESOTA.

POWER PLANT.

Application filed June 10, 1927. Serial No. 197,940.

My present invention has reference to a wind driven power plant which is especially designed for operating electric generators and like devices where the maintenance of an even speed is essential and the object is the provision of a power plant for this purpose in which the wind vanes or blades are under the control of governors which automatically regulate the pitch of the blades or vanes to throw the same into or out of the wind in accordance with the speed at which the blades are revolved so that the shaft operated by the blades will be turned at an even speed.

A further object is the provision, in a device for this purpose of governing means for the vanes or blades of a power plant of such construction and arrangement as to regulate the pitch of the blades with respect to the wind, and as a consequence to vary the speed of the shaft operated by the blades, but at the same time to maintain the turning of the shaft at predetermined desired speeds.

A still further object is the provision of a power plant of this type in which a shaft is suitably journaled on a support and which shaft carries at one of its ends a block in the nature of a head, the said block having its diagonally opposite corners notched to provide the remaining corners with extensions that receive therethrough the shafts for wind blades or vanes, and wherein said shafts have connected thereto the inner ends of the angle arms for centrifugal ball governors, the said arms of the governors being under the influence of adjustable springs whereby the swinging of the arms and the turning of the shafts of the wind vanes or blades is regulated to a nicety and further wherein the wind blades are disposed to the opposite sides of the shaft rotated by such blades.

To the attainment of the above broadly stated objects and many others which will present themselves as the nature of the invention is better understood, the improvement further resides in certain other novel features of construction, combination and operative association of parts, a satisfactory embodiment of which is disclosed by the accompanying drawings.

In the drawings:

Figure 2 is an end view thereof.

Figure 4 is an enlarged detail sectional view approximately on the line 4—4 of Figure 2.

Figure 1:
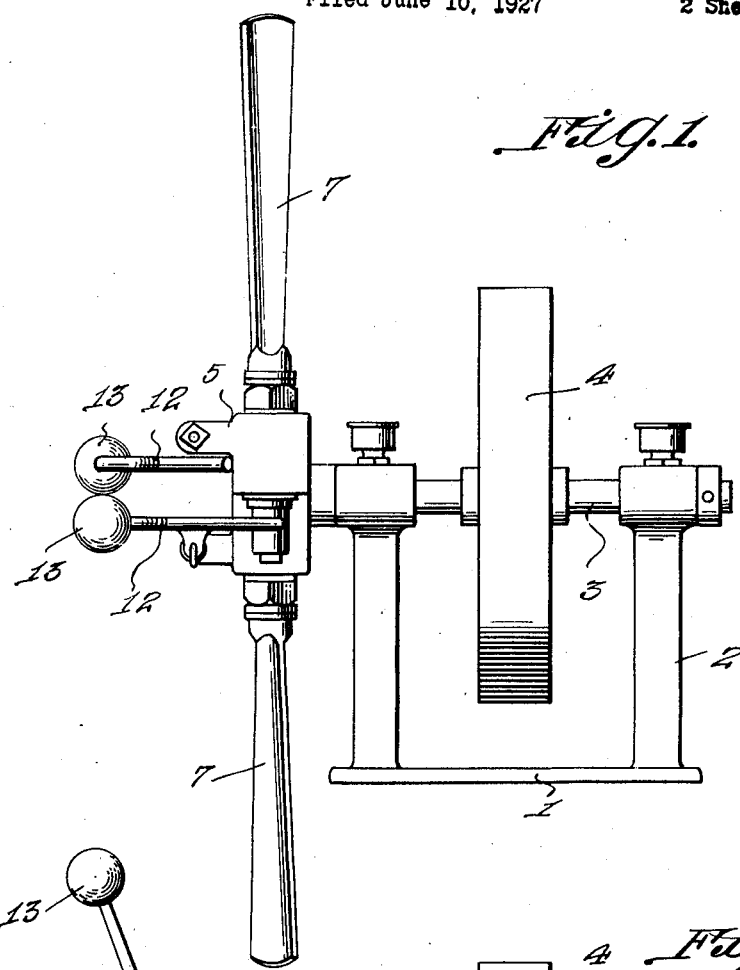
Figure 1 is a side elevation of a power plant in accordance with this invention.
Figure 3:
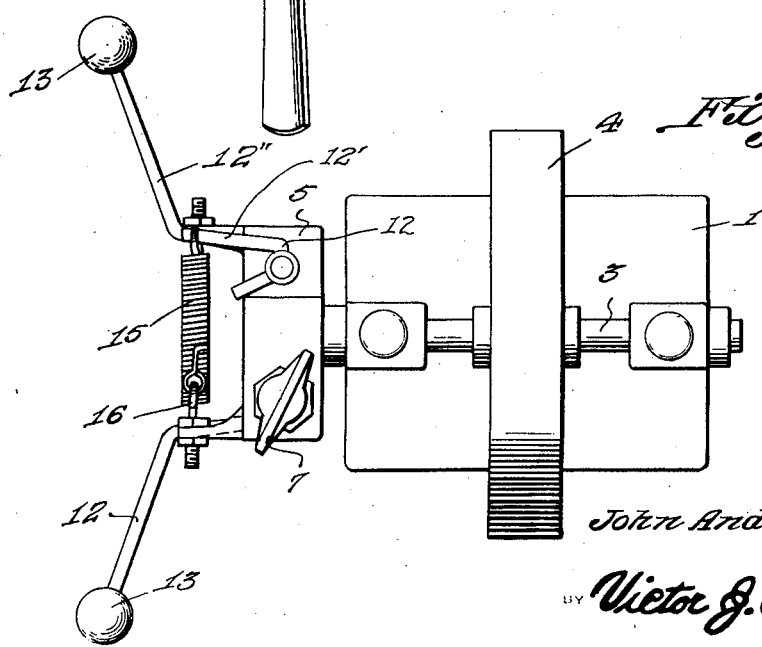
Figure 3 is a top plan view thereof.

From a base plate 1 there arise spaced standards 2. Journaled through suitable bearings in the standard there is the power shaft 3. Fixed on this shaft, between the standards 2 there is a belt wheel 4 that is hitched to the shaft of an electric generator or other device to be operated by the improvement. The bearings for the shafts 3 have lubricant cups associated therewith so that the free turning of the shaft is insured.

The shaft on one of its ends has fixed thereon a head block 5. In the showing of the drawing the block 5, has its diagonally opposite corners notched so that the remaining corners of the block are formed with what may be termed extensions and which are indicated by the numerals 6. Passing transversely through the extensions 6 from the outer sides of the block 5 there are shafts for wind blades or vanes 7. The shaft for each of the blades or vanes is indicated by the numeral 8, and as disclosed by Figure 4 of the drawings, each shaft passes through packing boxes fixed on the opposite faces of what I have termed the extensions 6 of the block 5, the said packing boxes and extensions providing therebetween pockets for waste 9 on to which is fed a lubricant that is let through a plugged opening in one of the packing boxes. The bores of the block through which the shafts pass are preferably formed with spiral grooves 10 to receive the lubricant from one to the other packing box and whereby the free turning of the stub shafts 8 in the block 5 is assured.

The shafts 8 project through the corner portions or extensions 6 of the block 5, and to each of these extensions there is fixed a sleeve 11, and either passing through or secured to each of said sleeves there is the inner offset end 12 of outwardly directed arms 12'. The arms 12' are bent to form the same with angle extensions 12", the said extensions being directed outwardly at opposite angles with respect to the sides of the block, and each of the said extensions 12" has a fixed weight 13 on the end thereof. The bent arms and weights provide the governors. Each of the bent arms has a lug extension 14, to which is connected one end of a coil spring 15. The second end of each of the coiled springs is connected to the eye portion of a bolt member 16. Each bolt passes through a lug 17 on the mentioned extensions 6 of the block 5. The bolts 16 are engaged by nuts 18—18 which contact respectively with the opposite faces of the lugs 17, and by this arrangement it will be noted that the tension of the springs may be adjusted and consequently the governors may have their weighted ends adjusted toward or away from the center of the power shaft 3, with the result that the angular relation of the vanes or blades 7 with respect to the wind will likewise be adjusted or regulated.

The simplicity of the construction and the operation thereof will, it is thought, be understood and appreciated by those skilled in the art to which the invention relates. The blades are arranged at the proper angle to be contacted by the wind so as to rotate the shaft 3. The governors are of the centrifugal type and should the blades rotate the shaft 3 at an excessive speed the governors will swing by centrifugal action and turn the stub shafts of the blades to bring the said blades partly or entirely out of the wind, with the result that the shaft 3 is rotated at a constant speed. By varying the tension of the springs the speed of the turning of the shaft 3 may be regulated to a nicety. The blades of the block are offset with respect to the center of the drive shaft so that the governor arms will have a tendency to ply outward as the speed increases and will thereby turn the blades out of the wind so that the said blades present a smaller driving surface, and thus insure the shaft being turned at an even speed. Obviously it is to be understood that I do not desire to be restricted to the precise details of construction herein set forth and, therefore, hold myself entitled to such changes therefrom as fairly fall within the scope of what I claim.

Having described the invention, I claim:—

1. In a device for the purpose set forth, a shaft, a block fixed on said shaft, a wind wheel comprising blades having stub shafts which are journaled through the block, a centrifugal governor for each of said stub shafts, each of said governors comprising a bent arm having its inner end fixed to the stub shaft and its outer angle end weighted, and spring means between said arms and block for adjusting the angular relation of the weighted ends of the arms with respect to said block, and for likewise adjusting the angular relation of the blades with respect to the block.

2. In a wind operated power plant, a shaft, a block fixed on one end of the shaft, said block having its diagonal corners notched to provide its opposite corners with extensions, a wind blade having a stub shaft that is journaled through a bearing opening in each of said extensions, and said blades being oppositely directed with respect to the block, centrifugal governors, each including a bent arm having an inner offset end which is fixed to each of the stub shafts and having a weight on the outer and angle end thereof, coil springs each having one of their ends fixed to one of said arms, and means adjustably connecting the second end of the springs to the block, all as and for the purpose set forth.

In testimony whereof I affix my signature.

JOHN ANDERSON.